April 29, 1930.   V. G. APPLE   1,756,501
DYNAMO ELECTRIC MACHINE
Filed Feb. 7, 1928
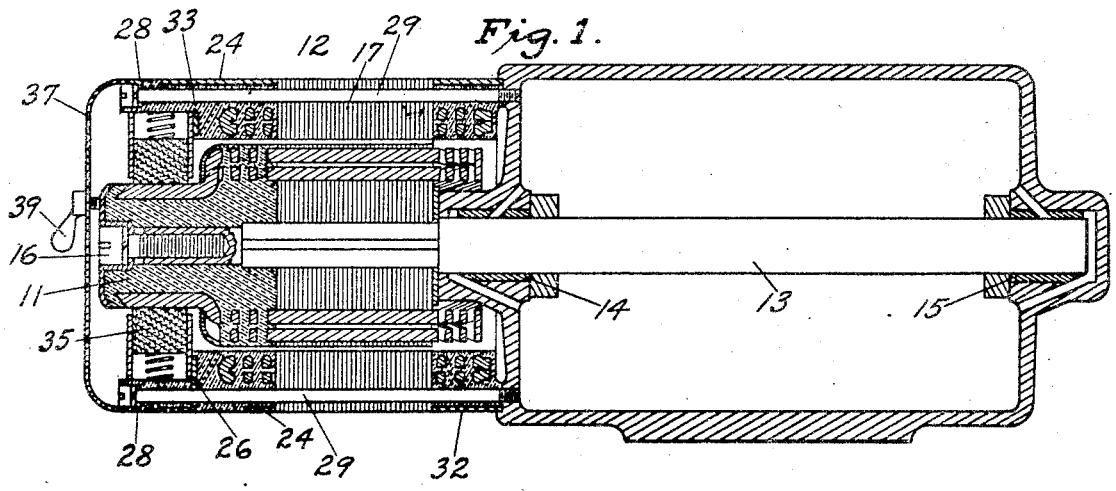
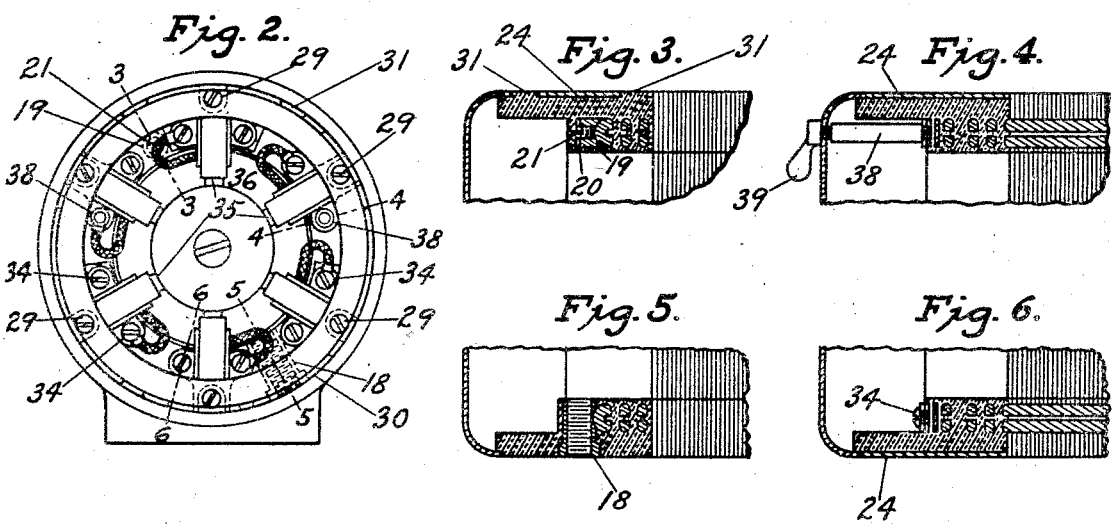
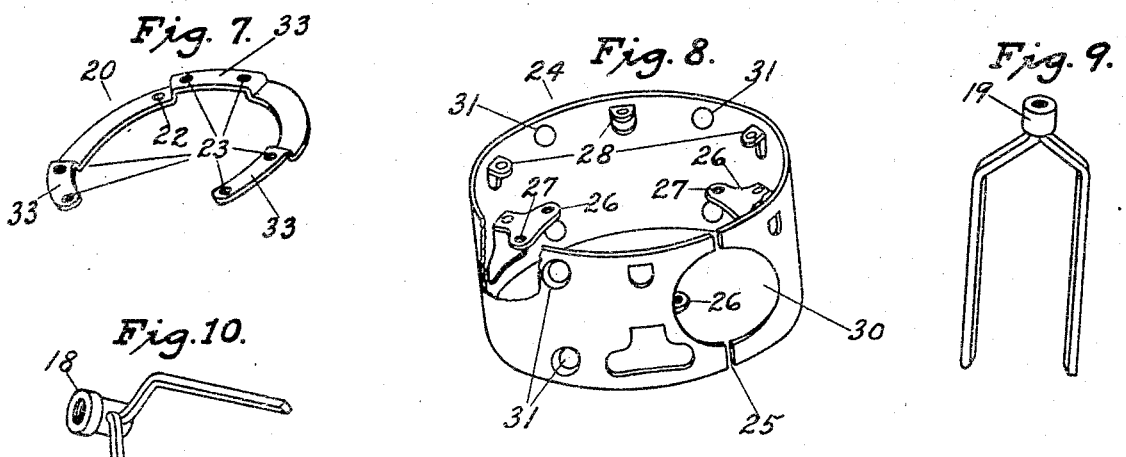
INVENTOR.
Vincent G. Apple Patented Apr. 29, 1930

1,756,501

UNITED STATES PATENT OFFICE

VINCENT G. APPLE, OF DAYTON, OHIO

DYNAMO-ELECTRIC MACHINE

Application filed February 7, 1928. Serial No. 252,589.

My invention relates to dynamo electric machines, the principal elements of which consist of parts made from sheet stock and drawn bars, held together in and by a die molding of insulating material.

An object in so using molded insulation is to make a better insulated dynamo electric machine more cheaply by eliminating metal parts, particularly those castings which neither serve to carry the electric current or the magnetic flux, but which are ordinarily provided merely as a means to which the electric and magnetic portions, and the binding posts, brush holders, etc., may be attached to permanently hold them in their respective relation.

Another object is to provide a more quiet running dynamo electric machine, a housing containing molded insulation having the effect of deadening the noise incident to rapidly rotating parts.

Still another object is to provide a structure wherein the member which serves to hold the electrical and magnetic elements in their respective relation also serves to keep them electrically insulated, one from another.

Further objects will be apparent to persons skilled in the art from the following description taken in conjunction with the drawings wherein—

Fig. 1 is a longitudinal cross section thru a dynamo electric machine built according to my invention.

Fig. 2 is an end view of the machine with the brush cover removed.

Figs. 3, 4, 5 and 6 are fragmentary sections taken at 3—3, 4—4, 5—5 and 6—6 respectively of Fig. 2.

Fig. 7 is a perspective view of the strip of metal which is imbedded in the molded insulation to carry current to the three positive brushes.

Fig. 8 is a perspective view of the ring of sheet metal which carries current from the three negative brushes to the ground and forms a protection for the molded insulation.

Fig. 9 shows the special loop which carries a connector to convey current from one end of the field winding to the three positive brushes.

Fig. 10 shows the special loop which carries the binding post to convey current to the other end of the field winding.

Similar numerals refer to similar parts thruout the several views.

For purposes of illustration I show a bar wound series motor, the armature 11 being wound substantially as shown in my co-pending application Serial No. 237,035 and the field 12 being wound substantially as shown in my co-pending application Serial No. 202,138.

The armature 11 is mounted in overhung fashion on shaft 13 which, in the instant case, has a bearing 14 and another widely spaced apart bearing 15 in the frame of the machine which the motor is adapted to drive, the space on the shaft between bearings 14 and 15 being intended to be occupied by some of the elements of said machine. Screw 16 holds the armature on the shaft.

Field element 12 comprises a laminated core 17 wound substantially as previously indicated, terminals for the winding being provided by welding hubs 18 and 19 (see Figs. 3, 5, 9 and 10) to the ends of the ordinary winding loops, hub 18 later serving as a binding post for connecting to the external circuit and hub 19 serving as a brush connection. The loops having these hubs welded thereon are placed at opposite points in the winding.

After the field winding is assembled with the core, brush connector strip 20, Fig. 7, is fastened to one end of the field winding by passing screw 21 thru hole 22 of the ring into hub 19 (see Figs. 3, 7 and 9). The strip 20 may be bent from strip stock. Holes 23 are tapped in the strip to provide means to fasten the three positive brush holders thereto with screws.

Ring 24, Fig. 8 is formed of a sheet of metal brought together at 25. Three ears are formed by slitting and bending portions of the sheet inwardly as at 26, 26, 26. These ears have tapped holes 27, 27, etc., wherein screws may extend to attach negative brush holders. Six somewhat shorter ears 28 are formed from the sheet in similar manner, and these provide seats for the heads of screws 29 (see Figs. 1 and 2) thru which current is carried to the ground. A portion 30 is cut away to clear the binding post 18, and tapered holes 31 having their largest diameter on the outside serve as ties for the molded insulation to engage.

Ring 32 (see Fig. 1) is somewhat similar to ring 24, being formed of sheet metal and having tapered holes 31 for ties, but being without the ears described relative to ring 24.

After the core 17 is wound and has the positive brush connector strip 20 fastened to the winding, and rings 24 and 32 are provided, the parts are ready for the molding operation. The parts are then placed in a tubular mold, first ring 32, next core 17, then ring 24, the rings serving to hold the core against axial movement in the mold. A center plug, equal to the armature bore of the field is of course provided as part of the mold. Moldable insulating material is then injected into all the space between the core and the outer wall of the mold not occupied by the windings, connectors, binding posts, etc. The insulation extends through the tapered holes 31 of rings 24 and 32 and thru the other cut away portions of ring 24 to hold the rings in place, and thru and about the windings and connectors to keep them located and insulated, leaving six metal brush terminals exposed, three of the six being the raised parts 33 of positive brush connector strip 20 and the other three being composed of ears 26 of ring 24 (see Figs. 1, 7 and 8). The six ears 28 also have their top surface exposed at the surface of the insulating mass so that the heads of screws 29 may make electrical contact therewith (see Fig. 1).

Six brush holders are held to the exposed metal brush terminals by screws 34, and six brushes 35 are connected by the usual pig tails 36 to an ear of each brush holder, to insure contact between a brush and its holder.

A brush cover 37 dowels over the end of the insulating mass shouldering against ring 24 to close the open end of the motor. At suitable intervals studs 38 are substituted for screws 34 (see Figs. 2, 4 and 6). Nuts 39 screwed on the ends of these studs hold the cover in place.

While for purposes of illustration only I have shown and described a certain type motor having a certain form of winding and a certain kind of brush holder it is obvious that my invention is applicable to motors or dynamos having other forms of winding and brush holders of any other type, the essence of the invention residing in the manner in which essential parts are made to serve both electrical and mechanical purposes and the manner of combining them into a composite structure.

Having described my invention, I claim—

1. A dynamo electric machine field element comprising, a core of magnetic material, a winding thereon and extending beyond the end thereof, a perforated metal cylinder surrounding said extending end at some distance therefrom, and a mass of insulation molded thru and about said extending end, and between said extending end and said cylinder and thru the perforations in said cylinder, to bind the whole together, into a unitary structure, wherein necessary parts are insulated one from another.

2. A dynamo electric machine field element comprising, a core of magnetic material, a winding thereon and extending beyond the end thereof, a perforated sheet of metal bent to cylinder form surrounding said extending end at some distance therefrom, said perforations being enlarged at their outer ends, and a mass of insulation molded about the extending end of the winding, between said winding and said perforated sheet and thru and into the enlarged end of said perforations to form radial ties to hold said sheet in place and to permanently locate and insulate the several parts of the structure.

3. A dynamo electric machine field element comprising, a core of magnetic material, a winding thereon and extending beyond the core at both ends, perforated sheet metal cylinders surrounding the extending ends of said winding at some distance therefrom, and a mass of insulation molded thru and about said extending ends and between said extending ends and said cylinders, and thru the perforations in said cylinders, to tie said cylinders into place and to insulate and permanently locate said windings.

4. A dynamo electric machine field element comprising, a core of magnetic material, a winding thereon extending beyond the core at both ends thereof, a perforated sheet of metal bent to cylinder form at each end of the core surrounding the extending ends of said winding at some distance therefrom, said perforations being enlarged at their outer ends, and a mass of insulation molded thru and about said extending ends, between said extending ends and said perforated sheets, thru and into the enlarged end of said perforations to form radial ties to hold said sheets in place and to permanently locate and insulate the several parts of the structure.

5. A dynamo electric machine field element comprising, a core of magnetic material, a winding thereon and extending axially therebeyond, a perforated metal cylinder surrounding the extending end of said winding at some distance therefrom, and a mass of insulation molded thru and about said extending end, between said extending end and said cylinder, thru the perforations of said cylinder to firmly hold said cylinder in place, and beyond the end of said cylinder to form an annular rib over which an end closing means may dowel to concentrically locate said end closing means on said field element.

6. A dynamo electric machine field element comprising, a core of magnetic material, windings thereon and extending axially therebeyond, a ring of conductive material adapted to carry brushes of one polarity, another ring of conductive material adapted to carry brushes of opposite polarity, and molded insulating material extending between said windings and rings to insulate them from each other and to hold them in their relative positions.

7. A dynamo electric machine field element comprising, a core of magnetic material, a winding thereon and extending beyond the core at both ends, a binding post to convey current to said winding, a brush terminal to convey current from said winding, a ring adapted to carry current to brushes of one polarity attached to said terminal, a ring adapted to carry current from brushes of the other polarity surrounding the first said ring, and molded insulating material extending thru and about the several parts of the structure to mechanically join them one to another and to electrically separate them one from another.

8. A dynamo electric machine field element comprising, a core of magnetic material, a winding thereon and extending beyond the core at both ends, a brush holder ring in circuit with said winding, a metal housing surrounding said winding and said ring, and molded insulating materal extending thru and about said winding and said ring to fill said housing but leaving parts of said ring exposed to carry brushes of one polarity and parts of said housing exposed to carry brushes of the other polarity.

9. A dynamo electric machine field element comprising, a core of magnetic material, a winding thereon and extending axially therebeyond, a brush holder ring in circuit with said winding, a metal member of tubular form surrounding and housing said winding and brush ring, and molded insulating material extending thru and about said winding and said brush ring, filling the space between said winding and said housing but leaving certain raised places on said ring extending thru the surface of said mass of molded insulation to carry current to brushes of one polarity and leaving extensions of said housing project inwardly thru the surface of said mass of molded insulation to carry brushes of the opposite polarity.

10. A dynamo electric machine field element comprising, a core of magnetic material, a winding thereon and extending axially therebeyond, a brush holder ring attached to said winding, a relatively thin walled metal tube surrounding said winding and brush ring, brackets formed by slitting and turning portions of the wall of said metal tube inwardly, leaving openings thru said wall, and molded insulation extending thru and about said winding and said brush ring, filling the space between said winding and said tube and extending into said openings in said wall to tie the several parts together to form a unitary structure wherein necessary parts are insulated one from another, said brush ring extending from the surface of said insulation mass at suitable points to electrically connect to brushes of one polarity and said brackets extending from the surface of said insulating mass at other points to electrically connect to brushes of opposite polarity.

11. A dynamo electric machine field element comprising, a core of magnetic material, a winding thereon and extending axially therebeyond, a brush holder ring attached to said winding, a perforated sheet of metal bent to cylinder form surrounding said brush ring and said extending end at some distance therefrom, said perforations being enlarged at their outer ends, brackets formed by slitting and turning portions of the cylinder wall inwardly, leaving openings thru said wall, and a mass of insulation molded between said winding and brush ring and said cylinder and into the openings left by said bracket portions and thru and into the enlarged ends of said perforations to form radial ties to hold the cylindrical sheet in place and the several other parts in fixed relation as well as insulated from each other, said brush ring having portions extending thru the surface of said insulation to electrically connect to brushes of one polarity, the brackets also extending thru said surface to connect to brushes of opposite polarity.

12. A dynamo electric machine field element comprising, a core of magnetic material, a winding thereon and extending axially therebeyond, a sheet of metal bent to cylinder form surrounding the extending portion of the winding, a plurality of brackets for supporting brush holders formed from inwardly bent parts of the metal sheet, a plurality of brackets thru which fastening screws extend formed from the inwardly bent parts of said sheet, a plurality of outwardly tapering holes thru said sheet, and a mass of molded insulating material extending thru the holes left by said brackets and into the tapered holes, to radially tie the sheet to the insulating mass to form a metal housing thereabout.

In testimony whereof I hereunto sign my name.

VINCENT G. APPLE.